(12) United States Patent
Lee et al.

(10) Patent No.: US 8,276,994 B2
(45) Date of Patent: Oct. 2, 2012

(54) SEALING MEMBER FOR MASTER CYLINDER AND MASTER CYLINDER HAVING THE SAME

(75) Inventors: Wang Soo Lee, Gyeonggi-do (KR); Kyu Man Lee, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 429 days.

(21) Appl. No.: 12/544,951

(22) Filed: Aug. 20, 2009

(65) Prior Publication Data

US 2010/0045100 A1     Feb. 25, 2010

(30) Foreign Application Priority Data

Aug. 22, 2008 (KR) .................. 10-2008-0082557

(51) Int. Cl.
*B60T 11/236*     (2006.01)
(52) U.S. Cl. .............. 303/114.1; 277/439; 277/510; 277/560; 188/358
(58) Field of Classification Search ........... 188/322.16–322.18, 358–360; 60/533, 585; 277/436–439, 277/549, 558, 560, 562, 510; 303/114.1–114.3
See application file for complete search history.

(56) References Cited

U.S. PATENT DOCUMENTS

| | | | | |
|---|---|---|---|---|
| 4,061,346 A | * | 12/1977 | Coleman et al. | 277/439 |
| 4,781,024 A | | 11/1988 | Nakamura | 60/533 |
| 5,328,178 A | * | 7/1994 | Nies | 277/438 |
| 5,507,505 A | * | 4/1996 | von-Arndt et al. | 277/560 |
| 6,290,235 B1 | * | 9/2001 | Albertson | 277/510 |
| 6,896,269 B2 | * | 5/2005 | Jackson | 277/544 |
| 7,181,911 B2 | | 2/2007 | Ishikawa et al. | |

FOREIGN PATENT DOCUMENTS

| | | |
|---|---|---|
| DE | 3312192 | 10/1984 |
| KR | 10-2007-0062258 A | 6/2007 |

OTHER PUBLICATIONS

Chinese Office Action issued in Chinese Patent Application No. 200910167440.5, dated Jun. 24, 2011.
German Office Action, and English translation thereof, issued in German Patent Application No. 10 2009 037 929.0 dated May 21, 2012.

* cited by examiner

*Primary Examiner* — Christopher Schwartz
(74) *Attorney, Agent, or Firm* — McDermott Will & Emery LLP (57) ABSTRACT

Disclosed herein are a sealing member for a master cylinder and a master cylinder having the same. The master cylinder is configured such that a communication hole of a piston is rapidly brought into communication with an oil path toward an oil tank upon release of braking. This may minimize meaningless retracting movement of the piston and delay in a braking release operation. The sealing member for the master cylinder includes an outer wing part to come into contact with the cylinder body, and an inner wing part to come into contact with the outer surface of the piston. The inner wing part includes a seal formed at a tip end thereof and at least one oil passage formed in a surface thereof opposite the outer surface of the piston.

8 Claims, 9 Drawing Sheets

FIG. 6b

SEALING MEMBER FOR MASTER CYLINDER AND MASTER CYLINDER HAVING THE SAME

CROSS-REFERENCE TO RELATED APPLICATION

This application claims the benefit of Korean Patent Application No. 2008-0082557, filed on Aug. 22, 2008 in the Korean Intellectual Property Office, the disclosure of which is incorporated herein by reference.

BACKGROUND

1. Field

Embodiments of the present invention relate to a sealing member for a master cylinder and a master cylinder having the same, in which a communication hole of a piston is rapidly brought into communication with an oil path toward an oil tank upon release of braking, so as to minimize delay in a braking release operation.

2. Description of the Related Art

Figure 1:
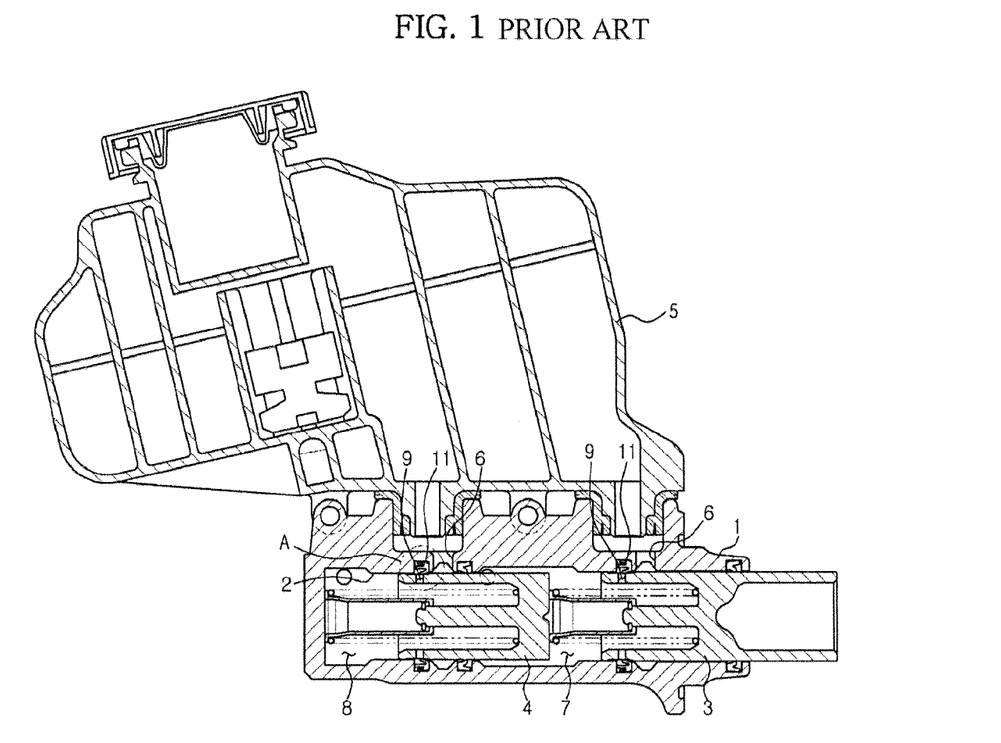
FIG. 1 is a sectional view illustrating a conventional master cylinder.

A master cylinder is a device to generate hydraulic pressure in a hydraulic brake system. FIG. 1 illustrates an example of a conventional tandem master cylinder and oil tank for use in an automobile.

As shown in FIG. 1, the master cylinder includes a first piston 3 and a second piston 4, which are arranged in a bore 2 of a cylinder body 1. The cylinder body 1 is formed with first and second oil inlets 6 in communication with an oil tank 5 and in turn, the first and second pistons 3 and 4 are formed respectively with communication holes 9 to introduce oil, having passed through the first and second oil inlets 6, into a first hydraulic pressure chamber 7 and a second hydraulic pressure chamber 8 defined in the bore 2 of the cylinder body 1. When the first and second pistons 3 and 4 are advanced, the communication holes 9 are displaced farther forward than sealing members 11, allowing the first and second hydraulic pressure chambers 7 and 8 to be pressed. On the contrary, when the first and second pistons 3 and 4 are retracted, the communication holes 9 are displaced farther rearward than the sealing members 11 until they are held in communication with the first and second oil inlets 6, allowing the oil in the first and second hydraulic pressure chambers 7 and 8 to be returned to the oil tank 5 and resulting in release of braking pressure.

Figure 2A:
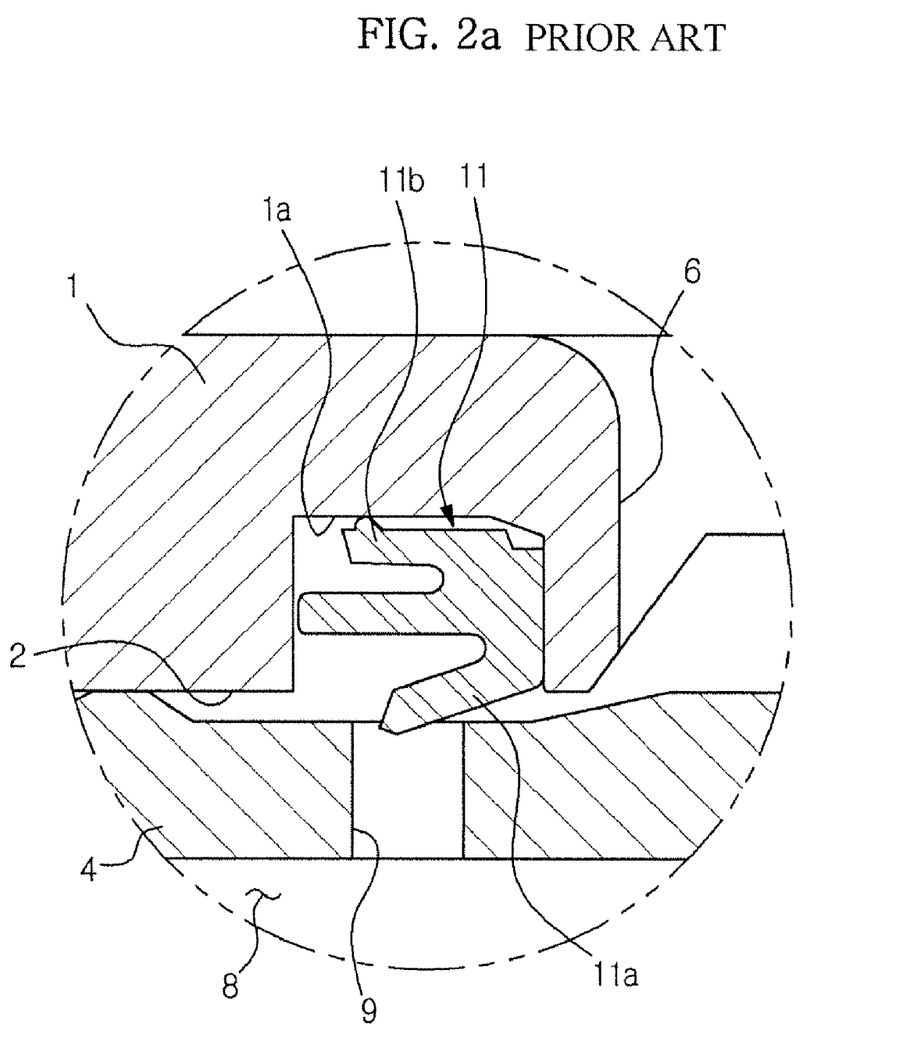
FIG. 2A is a detailed sectional view of the portion A of FIG. 1, illustrating a sealing member.

Each of the sealing members 11, as shown in FIG. 2A, takes the form of a ring and is fitted in a receiving recess 1a formed in the cylinder body 1. The sealing member 11 is referred to as a "cup seal" because of a cup-shaped cross sectional shape thereof, and consists of an inner wing part 11a that comes into contact with an outer surface of the piston 4 and an outer wing part 11b that comes into contact with an inner surface of the receiving recess 1a.

Figure 2B:
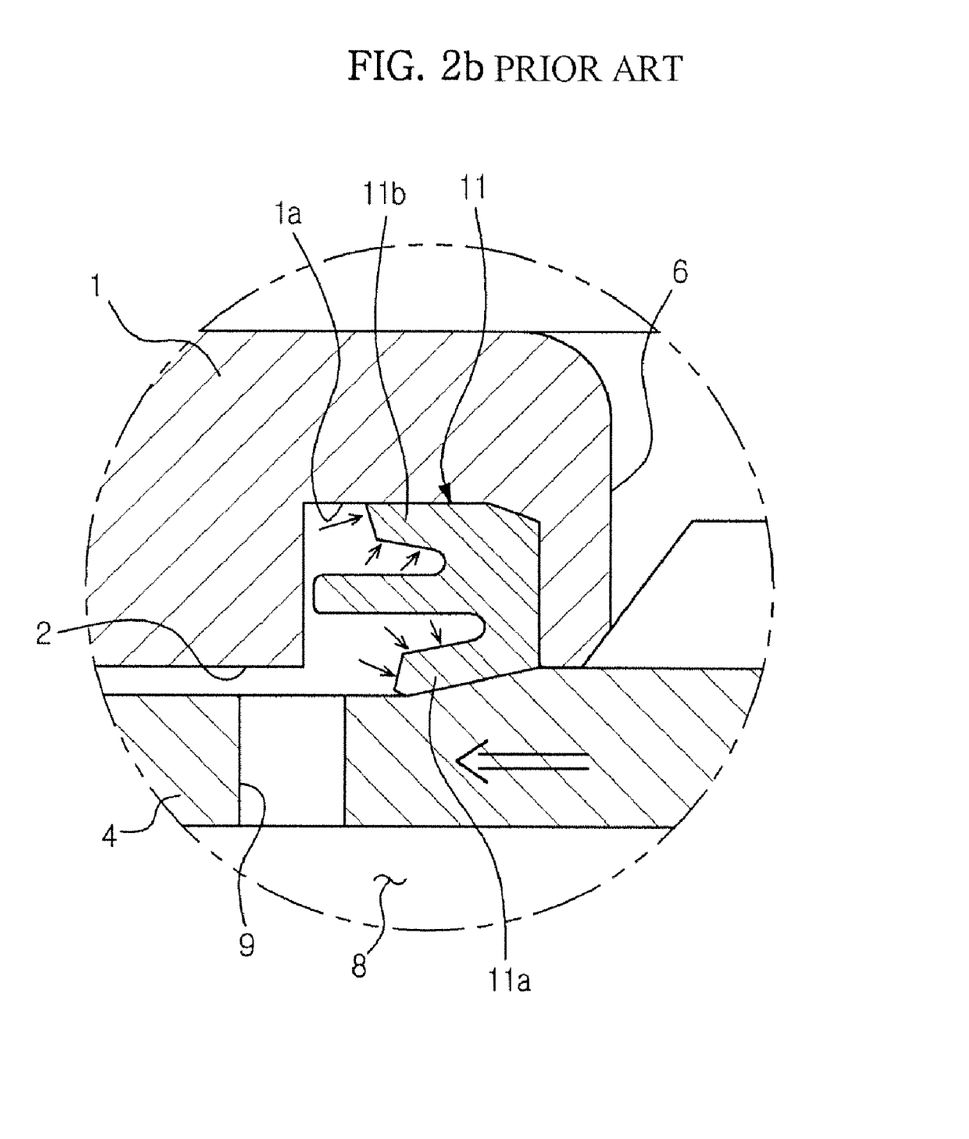
FIG. 2B is a detailed sectional view of the portion A of FIG. 1, illustrating the attitude of the sealing member when a piston is advanced.

Referring to FIG. 2B, since an inner surface of the sealing member 11 is affected by pressure generated in the hydraulic pressure chamber 8 when the piston 4 is advanced, the inner and outer wing parts 11a and 11b are brought into close contact with the outer surface of the piston 4 and the inner surface of the receiving recess 1a, acting to intercept passage of the oil and consequently, causing a rise in the pressure of the hydraulic pressure chamber 8. The rising pressure of the hydraulic pressure chamber 8 accelerates deformation of the inner and outer wing parts 11a and 11b, resulting in closer contact of the sealing member 11.

Figure 2C:
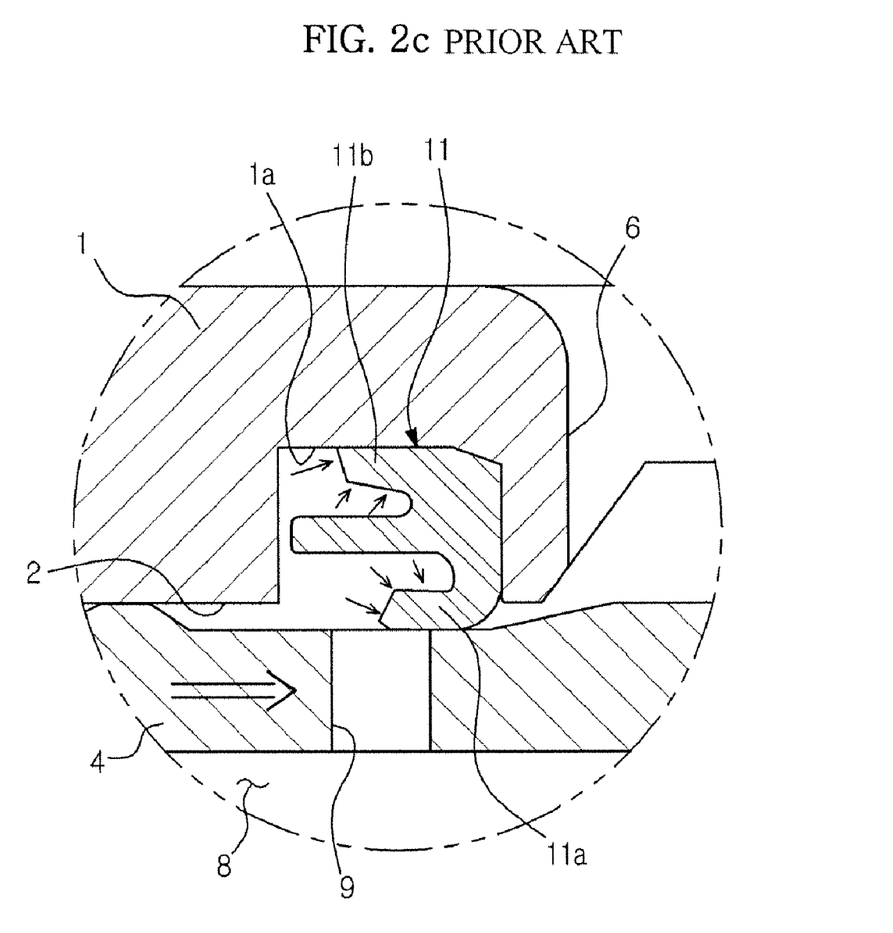
FIG. 2C is a detailed sectional view of the portion A of FIG. 1, illustrating the attitude of the sealing member when the piston is retracted.

However, the sealing member 11 tends to keep the deformed attitude thereof even when the piston 4 is retracted as shown in FIG. 2C. Therefore, the inner wing part 11a may close the communication hole 9 when the communication hole 9 reaches a tip end of the inner wing part 11a, thereby acting to intercept an oil return path. That is, since the deformed inner wing part 11a fails to be restored and thus, keeps the communication hole 9 closed even if the piston 4 is further retracted for a time after the communication hole 9 reaches the tip end of the inner wing part 11a, the piston 4 exhibits a so-called lost travel wherein the piston 4 is meaninglessly retracted by a predetermined distance upon release of braking, causing delay in a braking release operation. This phenomenon may be worsened when the pressure of the hydraulic pressure chamber 8 rises due to higher oil temperature in summer.

SUMMARY

Therefore, it is an aspect of the present invention to provide a sealing member for a master cylinder and a master cylinder having the same, in which a communication hole of a piston is rapidly brought into communication with an oil path toward an oil tank upon release of braking, so as to minimize meaningless retracting movement of the piston and delay in a braking release operation.

Additional aspects of the invention will be set forth in part in the description which follows and, in part, will be obvious from the description, or may be learned by practice of the invention.

In accordance with one aspect of the present invention, a sealing member for a master cylinder, installed between an inner surface of a cylinder body and an outer surface of a piston, includes an outer wing part to come into contact with the cylinder body, and an inner wing part to come into contact with the outer surface of the piston, the inner wing part including a seal formed at a tip end thereof and at least one oil passage formed in a surface thereof opposite the outer surface of the piston.

The at least one oil passage may take the form of an elongated groove extending in an advancing or retracting direction of the piston.

The at least one oil passage may include a plurality of oil passages arranged in the surface of the inner wing part so as to be spaced apart from one another.

In accordance with another aspect of the present invention, a master cylinder includes a cylinder body defining a hydraulic pressure chamber, at least one piston installed to be advanced or retracted on an inner surface of the cylinder body and having an oil communication hole, and at least one sealing member installed between the inner surface of the cylinder body and an outer surface of the piston, the sealing member including an outer wing part to come into contact with the cylinder body, and an inner wing part to come into contact with the outer surface of the piston, and the inner wing part including a seal formed at a tip end thereof and at least one oil passage formed in a surface thereof opposite the outer surface of the piston.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiment of the present invention, examples of which are illustrated in the accompanying drawings, wherein like reference numerals refer to like elements throughout.

Figure 3:
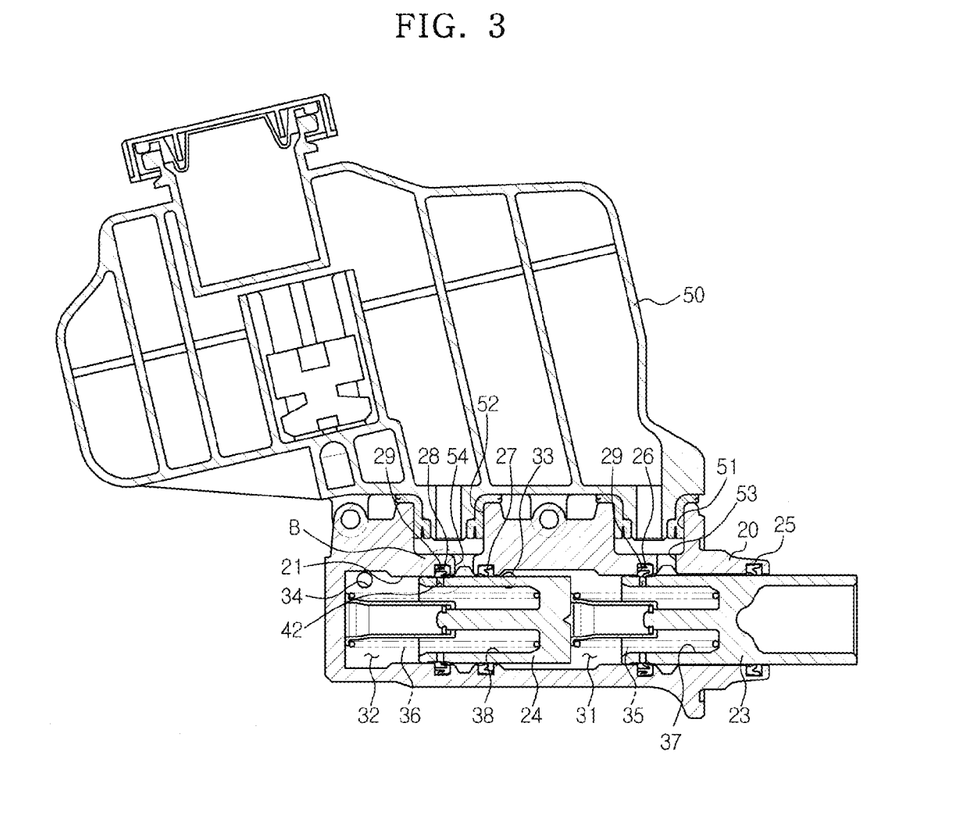
FIG. 3 is a sectional view illustrating a master cylinder according to an exemplary embodiment of the present invention.

FIG. 3 is a sectional view illustrating a master cylinder according to an exemplary embodiment of the present invention. As shown, the master cylinder includes a cylinder body 20 in which a bore 21 is defined, and a first piston 23 and second piston 24 which are arranged in the bore 21 of the cylinder body 20 so as to be advanced or retracted in the bore 21.

First and second sealing members 25 and 26 are installed between an inner surface of the bore 21 and an outer surface of the first piston 23, and third and fourth sealing members 27 and 28 are installed between the inner surface of the bore 21 and an outer surface of the second piston 24. The sealing members 25, 26, 27 and 28 are fitted respectively in receiving recesses 29 that are indented in the inner surface of the bore 21 and thus, are not moved even when the respective pistons 23 and 24 are advanced or retracted. With this configuration, the interior space of the bore 21 is divided into a first hydraulic pressure chamber 31 between the first piston 23 and the second piston 24, and a second hydraulic pressure chamber 32 between the second piston 24 and an inner end surface of the bore 21.

The cylinder body 20 has a first oil discharge hole 33 and second oil discharge hole 34 formed respectively toward the first hydraulic pressure chamber 31 and second hydraulic pressure chamber 32, so that oil in the first and second hydraulic pressure chambers 31 and 32 is discharged through the first and second oil discharge holes 33 and 34 when the first and second hydraulic pressure chambers 31 and 32 are pressed by the first and second pistons 23 and 24. Accordingly, as the first piston 23 is advanced and acts to press the first hydraulic pressure chamber 31, the second piston 24 is pressed by the pressure of the first hydraulic pressure chamber 31, acting to press the second hydraulic pressure chamber 32. The oil in the first and second hydraulic pressure chambers 31 and 32 is discharged through the first and second oil discharge holes 33 and 34, thereby being supplied to, e.g., a wheel cylinder (not shown).

A first restoration spring 35 is installed in the first hydraulic pressure chamber 31 and serves to restore the first piston 23 after completion of a braking operation. Also, a second restoration spring 36 is installed in the second hydraulic pressure chamber 32 and serves to restore the second piston 24. The first and second pistons 23 and 24 have spring receiving grooves 37 and 38 formed in front regions thereof, so that the first and second restoration springs 35 and 36 may be introduced into the respective grooves 37 and 38.

First and second oil inlet ports 51 and 52 in communication with an oil tank 50 and first and second oil inlets 53 and 54 corresponding to the first and second oil inlet ports 51 and 52 are formed in an upper portion of the cylinder body 20. The oil inlet ports 51 and 52 are held in communication with the first and second hydraulic pressure chambers 31 and 32 through the first and second oil inlets 53 and 54. For this, the first oil inlet 53 is located between the first sealing member 25 and the second sealing member 26, and the second oil inlet 54 is located between the third sealing member 27 and the fourth sealing member 28. The first and second pistons 23 and 24 have a plurality of communication holes perforated from the inner surface to the outer surface thereof, so that the oil, having passed through the first and second oil inlets 53 and 54, may be introduced into the first and second hydraulic pressure chambers 31 and 32 through the communication holes.

The second sealing member 26 and fourth sealing member 28 take the form of rings. Both the sealing members have the same configuration and thus, the following description focuses on the fourth sealing member 28.

Figure 4:
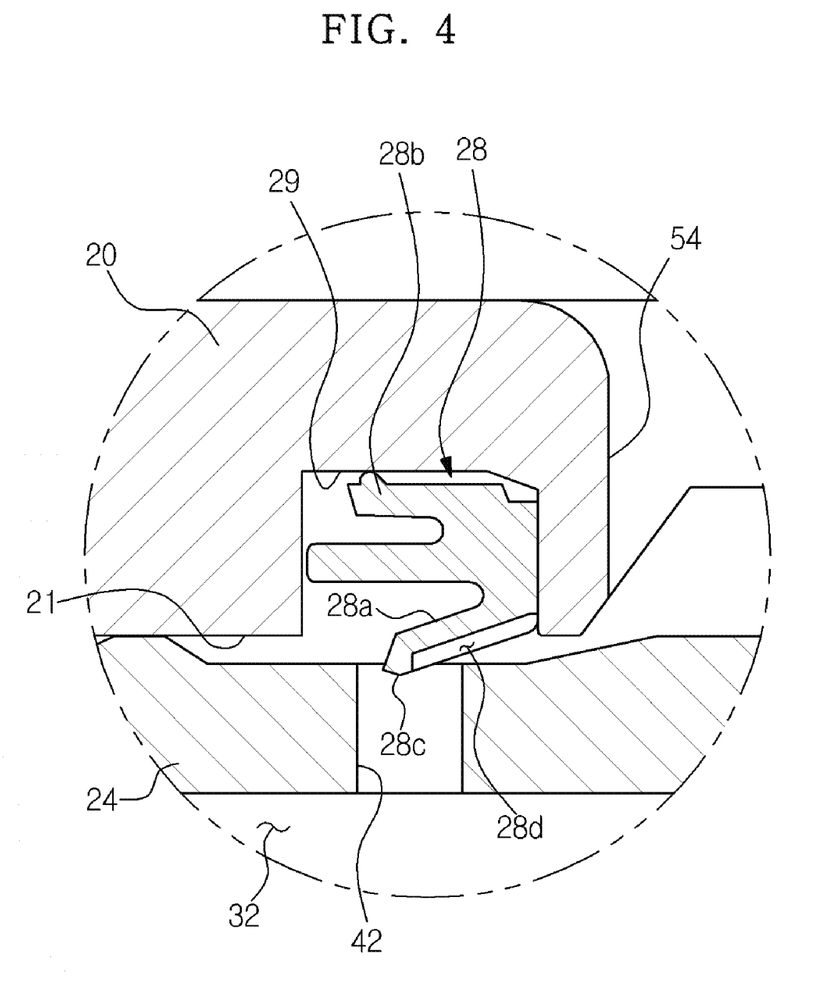
FIG. 4 is a detailed sectional view of the portion B of FIG. 3, illustrating a sealing member.
Figure 5:
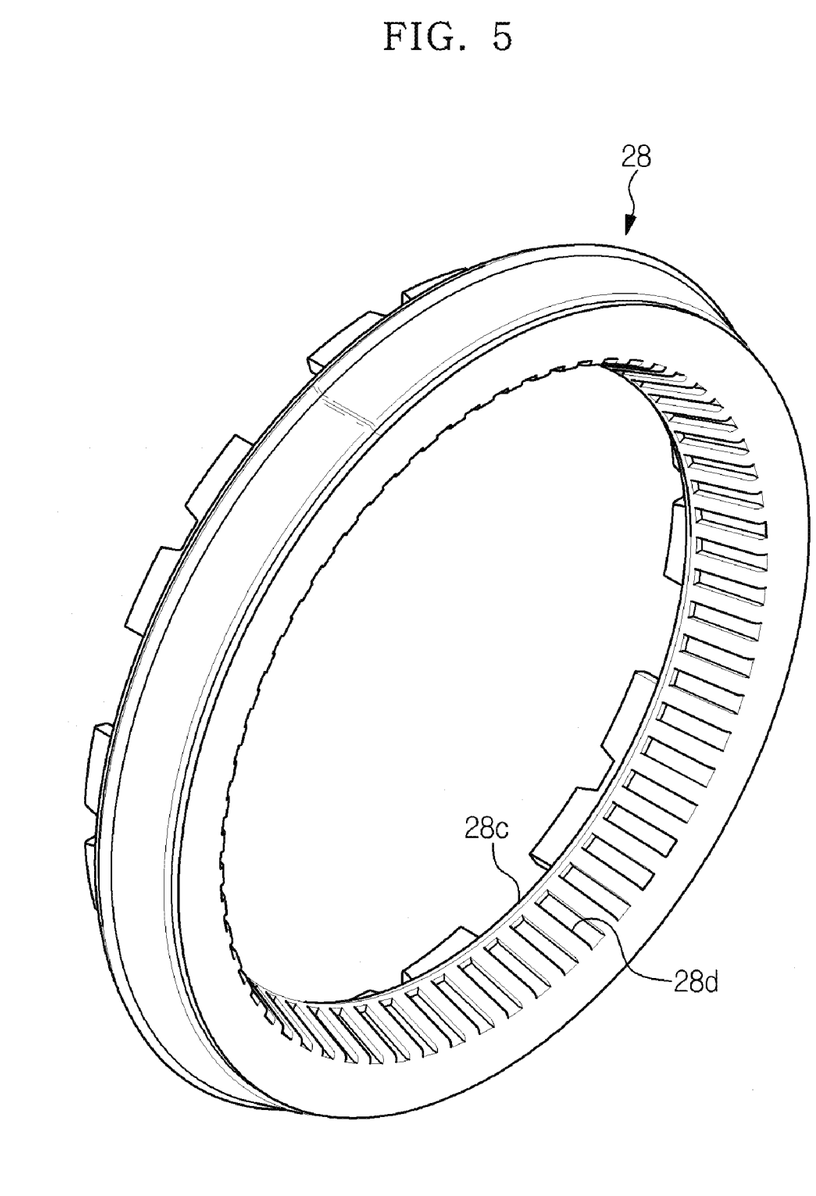
FIG. 5 is a perspective view of the sealing member for the master cylinder according to the embodiment of the present invention.

The fourth sealing member 28, as shown in FIGS. 4 and 5, has a cup-shaped form in cross section, and includes an inner wing part 28a that comes into contact with the outer surface of the second piston 24 and an outer wing part 28b that comes into contact with an inner surface of the receiving recess 29. The inner wing part 28a is formed at a tip end thereof with a seal 28c and also, in an inner surface thereof opposite the outer surface of the piston 24 with at least one oil passage 28d.

The seal 28c is formed at an inner periphery of a free end of the inner wing part 28a, so as not to overlap the oil passage 28d. As the seal 28c is kept in contact with the outer surface of the piston 24, the fourth sealing member 28 serves to close an oil path toward the outer surface of the piston 24. The oil passage 28d, as shown in FIG. 5, takes the form of an elongated groove extending in an advancing or retracting direction of the piston 24. The oil passage 28d occupies the inner surface of the inner wing part 28a except for an occupation area of the seal 28c. More specifically, a plurality of the oil passages 28d is indented in the inner surface of the inner wing part 28a and is spaced apart from one another by an interval in a circumferential direction of the inner surface of the inner wing part 28a.

Figure 6A:
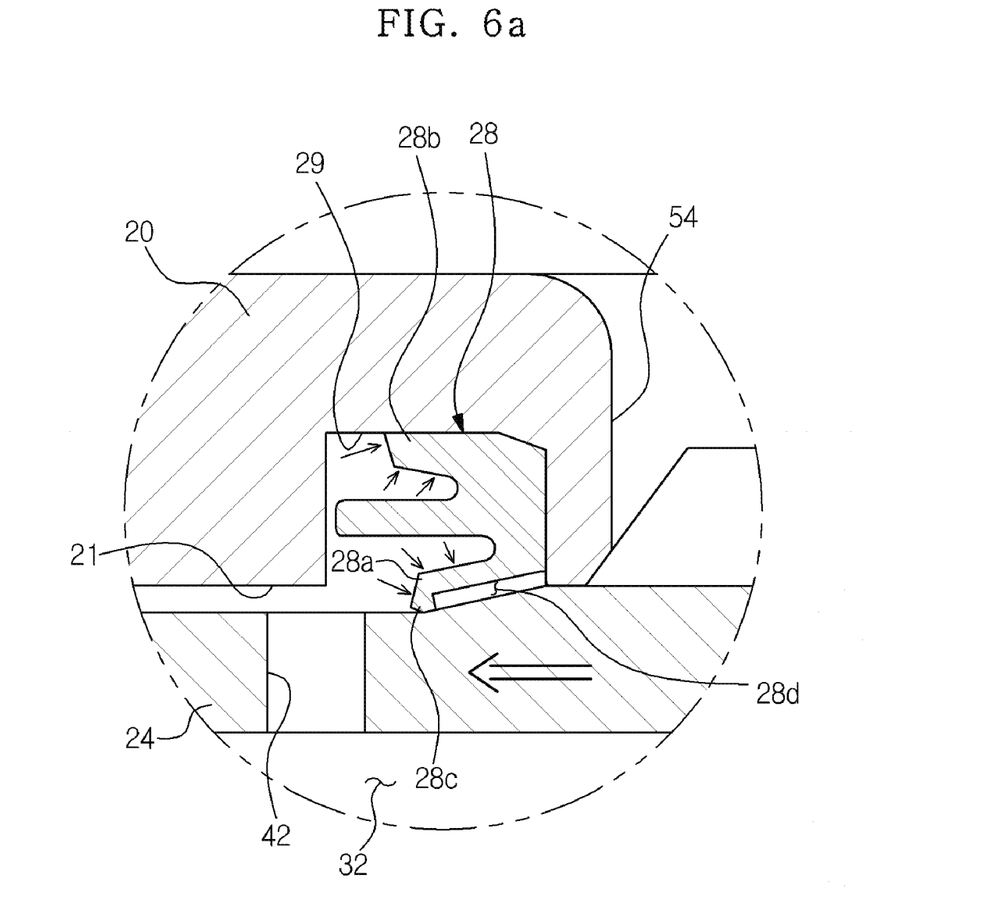
FIG. 6A is a detailed sectional view of the portion B of FIG. 3, illustrating the attitude of the sealing member when a piston is advanced.
Figure 6B:
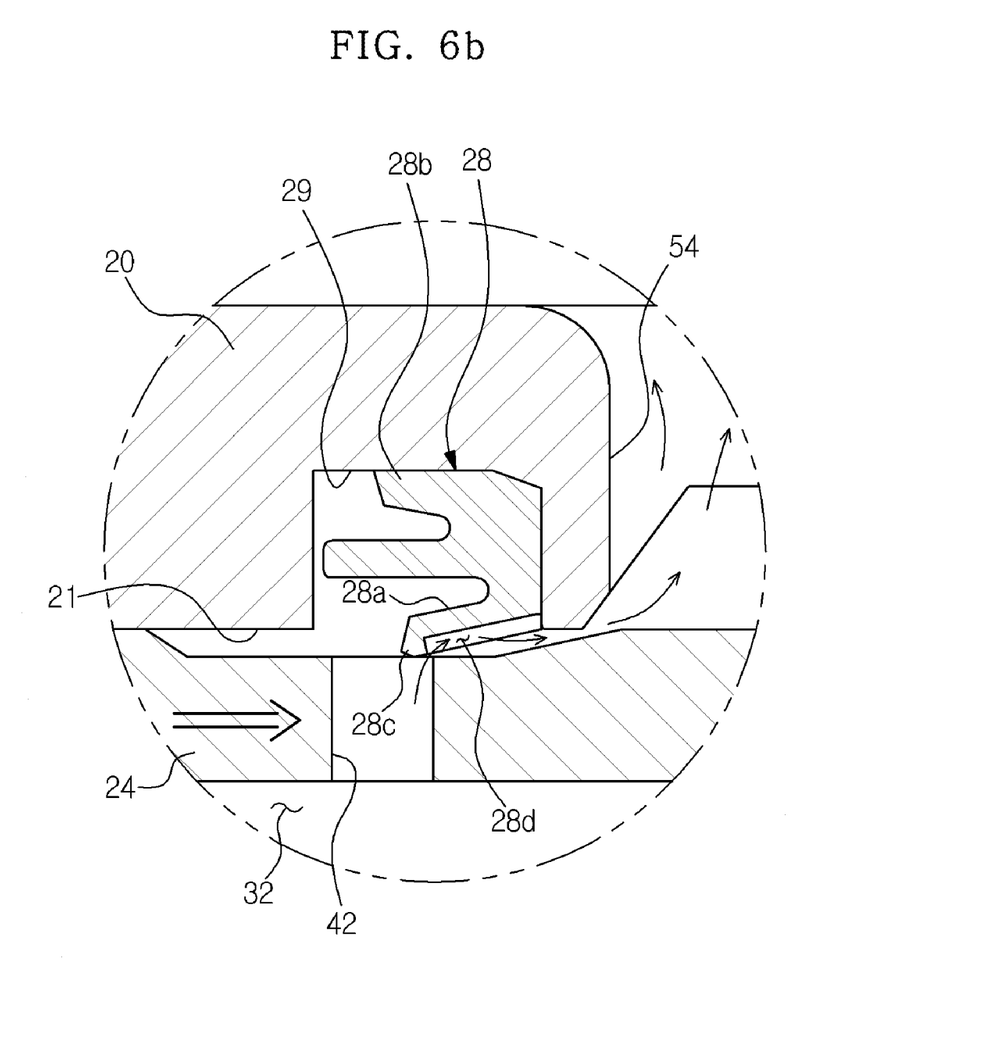
FIG. 6B is a detailed sectional view of the portion B of FIG. 3, illustrating the attitude of the sealing member when the piston is retracted.

Referring to FIG. 6B, when the piston 24 is retracted for release of braking, the oil passage 28d is brought into communication with the communication hole 42 of the piston 24 as soon as the communication hole 42 reaches the inner wing part 28a of the sealing member 28, creating communication between the hydraulic pressure chamber 32 and the oil tank 50 and resulting in rapid release of braking. That is, providing rapid creation of an oil return path upon release of braking may minimize meaningless retracting movement of the piston 24 and delay in a braking release operation.

Hereinafter, the general operation of the above-described master cylinder will be described.

As shown in FIG. 3, if the first piston 23 is pressed by braking operation, the first piston 23 is advanced, acting to press the first hydraulic pressure chamber 31. As the first hydraulic pressure chamber 31 is pressed, the second piston 24 is pressed and advanced by the pressure of the first hydraulic pressure chamber 31, acting to press the second hydraulic pressure chamber 32. In this case, each of the second and fourth sealing members 26 and 28, as shown in FIG. 6A, is deformed in such a manner that the outer wing part 28a comes into close contact with the inner surface of the receiving recess 29 and the seal 28c of the inner wing part 28a comes into close contact with the outer surface of the piston 24, causing a rise in the pressure of the first and second hydraulic pressure chambers 31 and 32. Thereby, the oil in the first and second hydraulic pressure chambers 31 and 32 is moved to, e.g., a wheel cylinder (not shown) through the first and second oil discharge holes 33 and 34, serving to induce braking.

Upon release of braking, the first and second pistons 23 and 24 are retracted by elasticity of the first restoration spring 35 and second restoration spring 36, thereby being returned to the original attitude thereof. In this case, the first and second oil inlets 53 and 54 are brought into communication with the first and second hydraulic pressure chambers 31 and 32 through the communication holes of the respective pistons 23 and 24. Also, as shown in FIG. 6B, the communication hole 42 of the piston 24 is brought into communication with the oil passage 28d of the inner wing part 28a as soon as the communication hole 42 reaches the inner wing part 28a of the sealing member 28, enabling rapid release of braking.

As is apparent from the above description, in a master cylinder according to the embodiment of the present invention, an inner wing part of a sealing member is formed at an inner surface thereof with an oil passage, so that a communication hole of a piston is brought into communication with the oil passage when the piston is retracted for release of braking. This allows first and second hydraulic pressure chambers of the master cylinder to be rapidly brought into communication with an oil tank, resulting in rapid release of braking. Consequently, meaningless retracting movement of the piston and delay in a braking release operation may be minimized.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A sealing member for a master cylinder installed between an inner surface of a cylinder body and an outer surface of a piston, comprising:
    an outer wing part to come into contact with the cylinder body; and
    an inner wing part to come into contact with the outer surface of the piston,
    wherein the inner wing part includes a seal formed at a tip end thereof and at least one oil passage formed in a surface thereof opposite the outer surface of the piston, and
    wherein the sealing member is fitted in a receiving recess that is formed in the cylinder body.

2. The sealing member according to claim 1, wherein the at least one oil passage takes the form of an elongated groove extending in an advancing or retracting direction of the piston.

3. The sealing member according to claim 2, wherein the at least one oil passage includes a plurality of oil passages arranged in the surface of the inner wing part so as to be spaced apart from one another.

4. The sealing member according to claim 1, wherein the piston includes a communication hole perforated from an inner surface to the outer surface thereof, said at least one oil passage being arranged and configured such that in a first position of the piston the at least one oil passage is in fluid communication with the communication hole and in a second position of the piston the at least one oil passage is not in fluid communication with the communication hole.

5. A master cylinder comprising a cylinder body defining a hydraulic pressure chamber, at least one piston installed to be advanced or retracted on an inner surface of the cylinder body and having an oil communication hole, and at least one sealing member installed between the inner surface of the cylinder body and an outer surface of the piston,
    wherein the sealing member includes an outer wing part to come into contact with the cylinder body, and an inner wing part to come into contact with the outer surface of the piston,
    wherein the inner wing part includes a seal formed at a tip end thereof and at least one oil passage formed in a surface thereof opposite the outer surface of the piston, and
    wherein the sealing member is fitted in a receiving recess that is formed in the cylinder body.

6. The master cylinder according to claim 5, wherein the at least one oil passage takes the form of an elongated groove extending in an advancing or retracting direction of the piston.

7. The master cylinder according to claim 6, wherein the at least one oil passage includes a plurality of oil passages arranged in the surface of the inner wing part so as to be spaced apart from one another.

8. The master cylinder according to claim 5, wherein the piston includes a communication hole perforated from an inner surface to the outer surface thereof, said at least one oil passage being arranged and configured such that in a first position of the piston the at least one oil passage is in fluid communication with the communication hole and in a second position of the piston the at least one oil passage is not in fluid communication with the communication hole.

* * * * *